United States Patent
Suzuki (10) Patent No.: US 7,453,496 B2
(45) Date of Patent: Nov. 18, 2008

(54) WIDE DYNAMIC RANGE DIGITAL IMAGE COMPOSITION

(75) Inventor: Nobuo Suzuki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 889 days.

(21) Appl. No.: 10/920,189

(22) Filed: Aug. 18, 2004

(65) Prior Publication Data
US 2005/0231606 A1  Oct. 20, 2005

(30) Foreign Application Priority Data
Aug. 25, 2003  (JP)  ............................. 2003-300065

(51) Int. Cl.
*H04N 5/228* (2006.01)
(52) U.S. Cl. .................. 348/221.1; 348/216.1; 382/284
(58) Field of Classification Search .............. 348/216.1, 348/218.1, 222.1, 239, 254; 382/284
See application file for complete search history.

(56) References Cited

U.S. PATENT DOCUMENTS

| | | | |
|---|---|---|---|
| 5,455,621 A | | 10/1995 | Morimura |
| 6,850,278 B1 * | | 2/2005 | Sakurai et al. ............... 348/302 |
| 2002/0145674 A1 * | | 10/2002 | Nakamura ................... 348/296 |
| 2004/0051790 A1 * | | 3/2004 | Tamaru et al. ............ 348/223.1 |

FOREIGN PATENT DOCUMENTS

| | | | |
|---|---|---|---|
| JP | 59-210775 A | | 11/1984 |
| JP | 6-141229 A | | 5/1994 |
| JP | 2000125209 | * | 4/2000 |
| JP | 2002-135649 A | | 5/2002 |

* cited by examiner

*Primary Examiner*—Lin Ye
*Assistant Examiner*—Gevell Selby
(74) *Attorney, Agent, or Firm*—Birch, Stewart, Kolasch & Birch, LLP

(57) ABSTRACT

An image composition method comprises: composing a high-sensitivity image signal H and a low-sensitivity image signal L, so as to generate a composite image signal Gc according to a composing expression:

$$Gc = k \cdot H + (1-k) \cdot L$$

where k is a composite parameter satisfying $0 \leq k \leq 1$, wherein the high-sensitivity image signal H is generated based on high-sensitivity image outputs from corresponding ones of a plurality of pixel positions in a solid-state imaging element that has imaged a subject; the low-sensitivity image signal L is generated based on low-sensitivity image outputs from corresponding ones of the plurality of pixel positions in the solid-state imaging element; and the composing is performed at every common pixel position by determining k at every common pixel position.

17 Claims, 8 Drawing Sheets

WIDE DYNAMIC RANGE DIGITAL IMAGE COMPOSITION

This Nonprovisional application claims priority under 35 U.S.C. § 119(a) on Patent Application No(s). 2003-300065 filed in Japan on Aug. 25, 2003, the entire contents of which are hereby incorporated by reference.

BACKGROUND OF THE INVENTION

1. Field of the Invention

The present invention relates to an image composition method or the like for producing an image signal having a wide dynamic range by composing together a high-sensitivity image signal and a low-sensitivity signal, which have been obtained by means of photographing a subject, and more particularly, to an image composition method, a solid-state imaging device, and a digital camera, which hardly cause brightness inversion and are suitable for producing a composite image having a high signal-to-noise ratio.

2. Description of the Related Art

An image photographed by a solid-state imaging device using a solid-state imaging element typified by a CCD image sensor or a CMOS image sensor has a shortcoming of a narrow dynamic range. For this reason, a photographic scene involving a wide dynamic range; for instance, optical images such as an image of a backlighted person or an afternoon garden observed by way of window panes from a dark, indoor location, cannot be acquired well.

Therefore, as described in JP-A-6-141229 (corresponding to U.S. Pat. No. 5,455,621), the related-art digital camera is equipped with a solid-state imaging element capable of controlling a period of accumulation of electric charges. An image signal obtained as a result of a subject having been exposed for a long period of time (hereinafter called a "long-exposure image signal") is read, and an image signal obtained by exposing the same subject for a short period of time (hereinafter called a "short-exposure image signal") is continuously read. These two image signals are subjected to composing operation, to thus produce an image of the subject having a wide dynamic range.

According to the related-art technique described in JP-A-59-210775, there is used a solid-state imaging element, wherein half of an array of pixels is formed as high-sensitivity pixels and a remaining half is formed as low-sensitivity pixels. An image signal obtained from the high-sensitivity pixels and an image signal obtained from the low-sensitivity pixels, both image signals having been obtained during the same exposure time, are merged together, thereby producing an image of the subject having a wide dynamic range.

A long-exposure image signal output from the solid-state imaging element or an image signal obtained from the high-sensitivity pixel is called a high-sensitivity image signal. Moreover, a short-exposure image signal or an image signal obtained from the low-sensitivity pixel is called a low-sensitivity image signal.

Digital data constraints are usually imposed on an image signal to be processed by a digital camera. For instance, even when a high-sensitivity image signal and a low-sensitivity image signal, not yet having been merged, are 8-bit signals, realization of an image signal of a composite image as a signal of a total of 16 bits is impossible in terms of costs. Therefore, composing operation must be performed such that an image signal of composite image having a wide dynamic range becomes an 8-bit signal.

Therefore, a composite image having a wide dynamic range suffers a drawback of a partial reduction in gradation difference of the image and the image becoming less-defined and monotonous.

Figure 9:
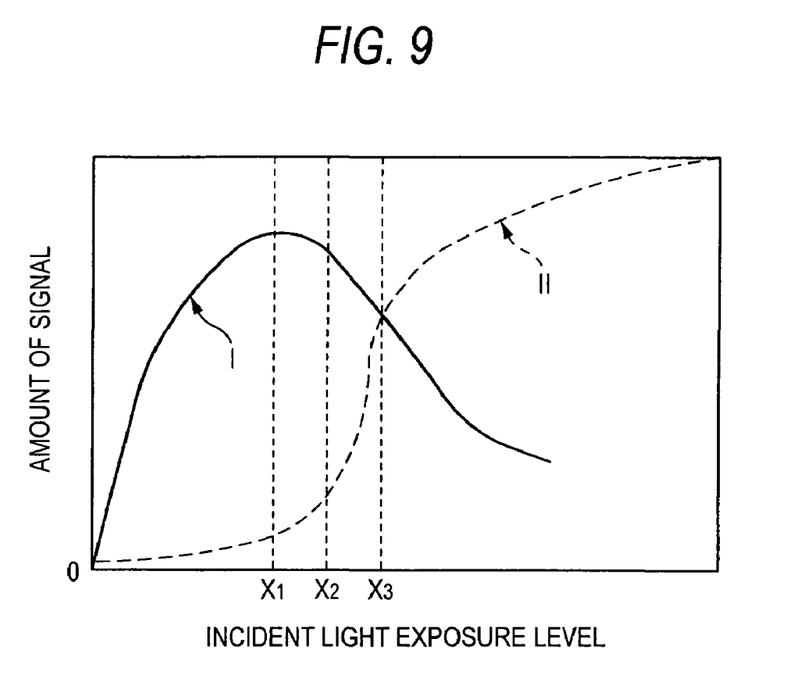
FIG. 9 is a descriptive view for describing drawbacks of a related-art technique.

For these reasons, according to the related-art technique described in JP-A-2002-135649, composite image data are generated at respective pixel positions on the entire screen through use of a gamma characteristic shown in FIG. 9. Namely, a high-sensitivity image signal is subjected to nonlinear conversion processing through use of a gamma characteristic I (solid line) which drastically suppresses a high-level region. A low-sensitivity image signal is subjected to nonlinear conversion processing through use of a gamma characteristic II (broken lines). The high-sensitivity image signal and the low-sensitivity image signal, which have undergone conversion processing, are added together, thereby producing a composite image signal. The thus-produced composite image signal expresses a gradation difference in a range in which losing color is induced as a result of saturation of the high-sensitivity image signal and a gradation difference in a range in which the low-sensitivity image signal becomes solid, thereby producing a well-defined composite image signal.

SUMMARY OF THE INVENTION

In the digital camera using the gamma characteristic shown in FIG. 9, the gamma characteristic I for a high-sensitivity image signal has become a gamma characteristic which drastically suppresses a high-level region. Therefore, the camera suffers a problem of deterioration of a signal-to-noise ratio in the high-level region.

Further, there is a necessity for preparing, in advance, a plurality of nonlinear gamma characteristics for a high-sensitivity image signal and a gamma characteristics for a low-sensitivity image signal. Further, any one must be selected from a gamma characteristic for a high-sensitivity image signal and a gamma characteristic for a low-sensitivity image signal in accordance with a photographing scene. Accordingly, this raises a problem of an increase in the memory capacity for storing the gamma characteristics and a hike in costs of the digital camera.

A gamma characteristic obtained by means of composing together a gamma characteristic I and a gamma characteristic II within a range of levels X1 through X3 of incident light exposure becomes a characteristic in which the amount of a signal decreases with an increase in the incident light exposure level. Specifically, when a pale white line is present in the base having the incident light exposure level X2, the level becomes inverted within the range X1 through X3, to thus become a black line. Conversely, there arises a problem of occurrence of brightness inversion, wherein a pale black line becomes a white line. The brightness inversion appears as a color offset in the case of a color image. The smaller a ratio at which an image portion falling with the ranges X1 through X3 accounts for the entire screen, the less noticeable the problem. However, when the image portion falling within the ranges X1 through X3, where brightness inversion arises, is wide, a composite image imparting an unusual feeling is produced.

The object of the invention is to provide an image composition method, a solid-state imaging device, and a digital camera, which can produce a well-defined composite image involving a superior signal-to-noise ratio, little brightness inversion, little color offset, and a wide dynamic range.

According to a first aspect of the invention, there is provided an image composition method comprising: composing a high-sensitivity image signal H and a low-sensitivity image signal L, so as to generate a composite image signal Gc according to a composing expression:

$$Gc = k \cdot H + (1-k) \cdot L$$

where k (hereinafter also called a "k" value) is a composite parameter satisfying $0 \leq k \leq 1$, wherein the high-sensitivity image signal H is generated based on high-sensitivity image outputs from corresponding ones of a plurality of pixel positions in a solid-state imaging element that has imaged a subject; the low-sensitivity image signal L is generated based on low-sensitivity image outputs from corresponding ones of the plurality of pixel positions in the solid-state imaging element; and the composing is performed at every common pixel position by determining k at every common pixel position.

According to a second aspect of the invention, there is provided an image composition method as set forth in the first aspect of the invention, wherein the high-sensitivity image output and the low-sensitivity image output are image outputs from a high-sensitivity pixel and a low-sensitivity pixel in a common pixel position, respectively.

According to a third aspect of the invention, there is provided an image composition method as set forth in the first aspect of the invention, wherein the high-sensitivity image output is an image output by a longer period of exposure, and the low-sensitivity image output is an image output by a shorter period of exposure, by using a common pixel.

By means of this configuration, the low-sensitivity image signal is dominantly subjected to composing operation within a bright range on a screen, and the high-sensitivity image signal is dominantly subjected to composing operation within a dark range on a screen. Hence, there can be obtained a superior composite image which involves little brightness inversion and color offset. There is also obviated a necessity for using a gamma characteristic which drastically suppresses a high-level region. Hence, a signal-to-noise ratio is also improved.

According to a fourth aspect of the invention, there is provided an image composition method as set forth in the first aspect of the invention, wherein the high-sensitivity image signal H is a signal $G_H(D_H)$ obtained by converting a high-sensitivity image signal $D_H$ with a nonlinear characteristic $G_H$ for a high-sensitivity image signal, the high-sensitivity image signal $D_H$ being generated based on the high-sensitivity image outputs; and the low-sensitivity image signal L is a signal $G_L(D_L)$ obtained by converting a low-sensitivity image signal $D_L$ with a nonlinear characteristic $G_L$ for a low-sensitivity image signal, the low-sensitivity image signal $D_L$ being generated based on the low-sensitivity image outputs.

By means of this configuration, a large number of gradation levels are assigned to the low-sensitivity image signal within the bright area on the screen. A large number of gradation levels are assigned to the high-sensitivity image signal within the dark area on the screen. A composite image involving little black solid or little loss of color in the entire screen is obtained.

According to a fifth aspect of the invention, there is provided an image composition method as set forth in the fourth aspect of the invention, further comprising: replacing the low-sensitivity image signal $D_L$ before undergoing nonlinear conversion with a low-sensitivity image signal $D'_L$ formed from the high-sensitivity image signal $D_H$ before undergoing nonlinear conversion, in a signal level range in which a linear value of the high-sensitivity image signal $D_H$ is lower than a predetermined level.

By means of this configuration, a signal-to-noise ratio of a low-level signal of the composite image signal is improved, whereby a good composite image can be obtained.

According to a sixth aspect of the invention, there is provided an image composition method as set forth in the fifth aspect of the invention, wherein, when a high-sensitivity image signal/a low-sensitivity image signal at a predetermined exposure time is assumed to be equal to a sensitivity ratio, the low-sensitivity image signal $D'_L$ is obtained as a result of subjecting to weighting average the low-sensitivity image $D_L$ and a signal provided as [the high-sensitivity image signal $D_H$/the sensitivity ratio]; and the low-sensitivity image signal $D_L$, which is subjected to the weighting average in accordance with a change in the high-sensitivity signal $D_H$ from the predetermined level to a zero level, is changed from 100% to 0%.

By means of this configuration, the ratio of a composite image in the low-sensitivity image signal having a poor signal-to-noise ratio is decreased, and a more beautiful composite image can be obtained.

According to a seventh aspect of the invention, there is provided an image composition method as set forth in the fourth aspect of the invention, further comprising: replacing the nonlinearly-converted low-sensitivity image signal $G_L(D_L)$ with a low-sensitivity image signal $G'_L$ formed from the nonlinearly-converted high-sensitivity image signal $G_H(D_H)$, in a signal level range in which a linear value of the high-sensitivity image signal $D_H$ is lower than a predetermined level.

By means of this configuration, a signal-to-noise ratio of a low-level signal of the composite image signal is improved, whereby a good composite image can be obtained.

According to an eighth aspect of the invention, there is provided an image composition method as set forth in the seventh aspect of the invention, wherein, when a high-sensitivity image signal/a low-sensitivity image signal at a predetermined exposure time is assumed to be equal to a sensitivity ratio and a nonlinearly-converted sensitivity ratio is obtained by nonlinearly-converting the sensitivity ratio, the low-sensitivity image signal $G'_L$ is obtained as a result of subjecting to weighting average the low-sensitivity image $G_L(D_L)$ and a signal obtained by dividing [the high-sensitivity image signal $G_H(D_H)$/the nonlinearly-converted sensitivity ratio]; and the low-sensitivity image signal $G_L(D_L)$, which is subjected to the weighting average in accordance with a change in the high-sensitivity signal $G_H(D_H)$ from the predetermined level to a zero level, is changed from 100% to 0%.

By means of this configuration, the ratio of a composite image in the low-sensitivity image signal having a poor signal-to-noise ratio is decreased, and a more beautiful composite image can be obtained.

According to a ninth aspect of the invention, there is provided an image composition method as set forth in the fourth aspect of the invention, wherein the nonlinear characteristic $G_H$ for the high-sensitivity signal and the nonlinear characteristic $G_L$ for the low-sensitivity signal have a characteristic of realizing a monotonously-increasing function, whose change in a secondary differential value; i.e., a slope, is positive or zero at all times; and the nonlinear characteristic $G_H$ for the high-sensitivity signal and the nonlinear characteristic $G_L$ for the low-sensitivity signal assume identical characteristics.

According to a tenth aspect of the invention, there is provided an image composition method as set forth in the fourth aspect of the invention, wherein the nonlinear characteristic $G_H$ for the high-sensitivity signal and the nonlinear characteristic $G_L$ for the low-sensitivity signal have a characteristic of realizing a monotonously-increasing function, whose change in a secondary differential value; i.e., a slope, is positive or zero at all times; and the nonlinear characteristic $G_H$ for the high-sensitivity signal and the nonlinear characteristic $G_L$ for the low-sensitivity signal assume different characteristics.

These configuration makes it difficult to cause more brightness inversion and color offset. There can be provided a composite image in which brightness inversion or color offset is less noticeable, even when brightness inversion or color offset has arisen.

According to an eleventh aspect of the invention, there is provided an image composition method as set forth in the first aspect of the invention, wherein, in a case where the k for the pixel position of interest is determined, the k is determined as a value closer to 1 when an optical image is relatively dark and the k is determined as a value closer to 0 when the optical image is relatively bright, in accordance with a mean contrast of the optical image within a predetermined range centered on the pixel position of interest.

By means of this configuration, a composition ratio of the high-sensitivity image signal to the low-sensitivity image signal is adjusted by means of average brightness and darkness within a predetermined range.

According to a twelfth aspect of the invention, there is provided a solid-state imaging device comprising: a solid-state imaging element comprising a plurality of pixel positions, the solid-state imaging element imaging a subject; and an image processing portion that composes a high-sensitivity image signal H and a low-sensitivity image signal L, so as to generate a composite image signal Gc according to a composing expression:

$$Gc = k \cdot H + (1-k) \cdot L$$

where k is a composite parameter satisfying $0 \leq k \leq 1$, wherein the high-sensitivity image signal H is generated based on high-sensitivity image outputs from corresponding ones of the plurality of pixel positions; the low-sensitivity image signal L is generated based on low-sensitivity image outputs from corresponding ones of the plurality of pixel positions; and the composing is performed at every common pixel position by determining k at every common pixel position.

By means of this configuration, the low-sensitivity image signal is dominantly subjected to composing operation within a bright range on a screen, and the high-sensitivity image signal is dominantly subjected to composing operation within a dark range on a screen. Hence, there can be obtained a superior composite image which involves little brightness inversion and color offset.

According to a thirteenth aspect of the invention, there is provided a solid-state imaging device as set forth in the twelfth aspect of the invention, wherein the high-sensitivity image signal H is a signal $G_H(D_H)$ obtained by converting a high-sensitivity image signal $D_H$ with a nonlinear characteristic $G_H$ for a high-sensitivity image signal, the high-sensitivity image signal $D_H$ being generated based on the high-sensitivity image outputs; and the low-sensitivity image signal L is a signal $G_L(D_L)$ obtained by converting a low-sensitivity image signal $D_L$ with a nonlinear characteristic $G_L$ for a low-sensitivity image signal, the low-sensitivity image signal $D_L$ being generated based on the low-sensitivity image outputs.

By means of this configuration, there can be output a composite image which involves much less brightness inversion or must less color offset.

According to a fourteenth aspect of the invention, there is provided a digital camera comprising a solid-state imaging device as set forth in the twelfth aspect of the invention.

By means of this configuration, a superior composite image involving little brightness inversion or color offset can be generated and stored on a recording medium.

DETAILED DESCRIPTION OF THE INVENTION

Embodiments of the invention will be described hereinbelow by reference to the drawings.

First Embodiment

Figure 1:
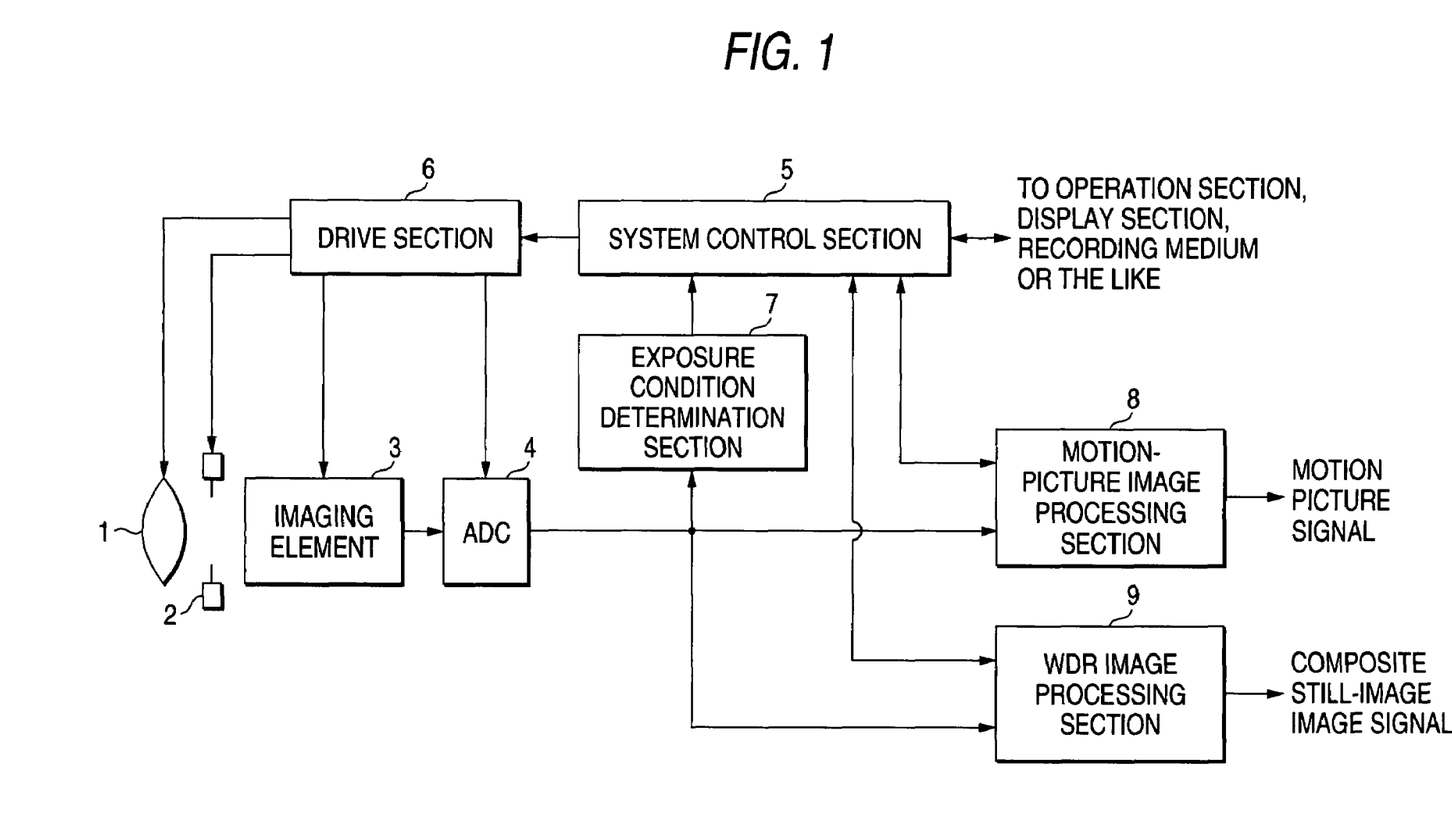
FIG. 1 is a block diagram of a digital camera according to a first embodiment of the present invention.

FIG. 1 is a block diagram of a digital camera according to a first embodiment of the invention. The digital camera is a digital still camera, but the present invention can also be applied to a digital camera of another type, such as a digital video camera.

In FIG. 1, the digital camera according to the embodiment comprises an optical system 1 such as a lens; a mechanical shutter 2 disposed behind the optical system 1; a solid-state imaging element 3, such as a CCD or CMOS, for converting, into an electrical signal, an optical image of a subject formed by the optical system 1; an analog-to-digital conversion circuit (ADC) 4 for converting an analog image pickup signal output from the solid-state imaging element 3 into a digital signal; a system control section 5 for controlling the entirety of the digital camera in a centralized manner; a drive section 6 for driving and controlling the optical system 1, the mechanical shutter 2, the solid state imaging element 3, and the ADC 4 in accordance with a command signal output from the system control section 5; and an exposure condition determination section 7 which acquires R (red), G (green), and B (blue) image signals output from the ADC 4, and which calculates an optimum exposure condition and outputs the parameter and the optimum exposure condition to the system control section 5.

As described in the above-described JP-A-6-141229, the solid-state imaging element 3 that images the subject may be of a type wherein pixels having the same sensitivity are arranged in an array, and a high-sensitivity image signal obtained through long exposure and a low-sensitivity image signal obtained through short exposure are output. Moreover, as described in the above-described JP-A-59-210775, the solid-state imaging element 3 that images the subject may also be of another type, wherein high-sensitivity pixels and low-sensitivity pixels are arranged adjacently in an array on the surface of the semiconductor substrate in a two-dimensional manner, and a high-sensitivity image signal obtained from high-sensitivity pixels and a low-sensitivity image signal obtained from low-sensitivity pixels are output. The digital camera is described as being equipped with the solid-state imaging element 3 having the high-sensitivity pixels and the low-sensitivity pixels formed therein.

Incidentally, other well-known structures for imaging the subject by using a plurality of pixel positions may also be employed.

The digital camera further comprises a motion-picture image processing section 8 and a still-image image processing section 9. The motion-picture image processing section 8 acquires an RGB image signal output from the ADC 4, performs image processing in accordance with a command from the system control section 5, and outputs a motion-picture signal. This motion-picture signal is displayed as a through image on a color liquid-crystal display section or the like provided on the back of a camera or the like or is recorded in a recording medium.

The still-image image processing section 9 performs image processing in accordance with a command from the system control section 5 and merges an RGB high-sensitivity image signal and an RGB low-sensitivity image signal, both being output from the ADC 4, in a manner to be described later, thereby generating and outputting subject image data having a wide dynamic range (WDR).

Figure 2:
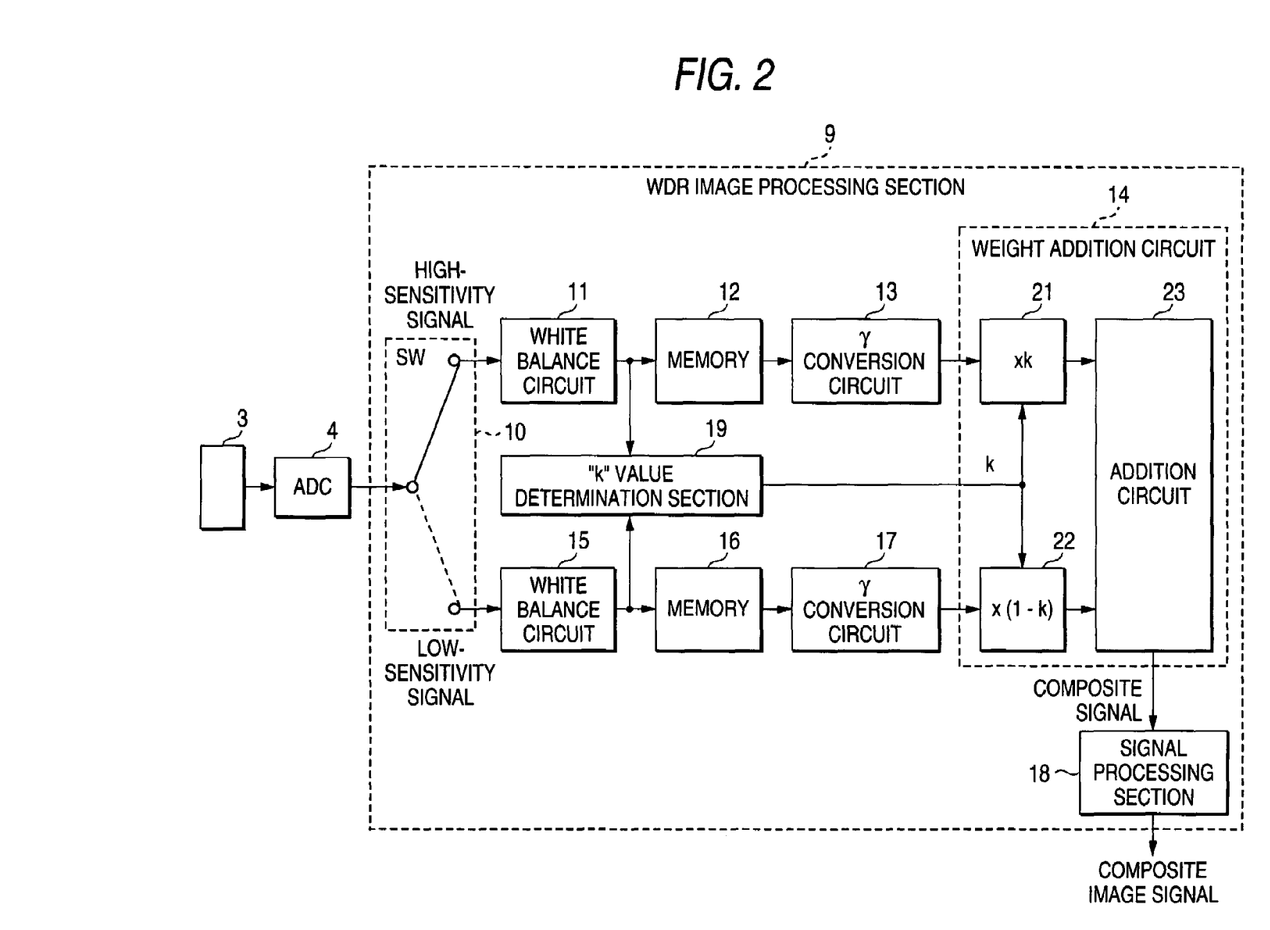
FIG. 2 is a detailed block diagram of a still-image (WDR) image processing section shown in FIG. 1.

FIG. 2 is a detailed block diagram of the image processing section 9 shown in FIG. 1. This still-image image processing section 9 comprises a switch 10 for switching an output path depending on whether the image signal acquired from the ADC 4 is an image signal of high density or an image signal of low density; a white balance circuit 11 which captures a high-sensitivity image signal and subjects the signal to white balance correction; memory 12 for temporarily retaining an image signal $D_H$ of high sensitivity having undergone white balance; and a gamma conversion circuit 13 which subjects the image signal of high density $D_H$ acquired by way of the memory 12 to gamma conversion processing $G_H$, which is nonlinear processing, and which outputs the gamma-converted high-sensitivity image signal $G_H(D_H)$ to a weight addition circuit 14 on a subsequent stage.

The image processing section 9 further comprises a white balance circuit 15 which captures a low-sensitivity image signal from the switch 10 and subjects the image signal to white balance correction; memory 16 for temporarily retaining the low-sensitivity image signal $D_L$ having undergone white balance correction; a gamma conversion circuit 17 which subjects the low-sensitivity image signal $D_L$ captured by way of the memory 16 to gamma conversion $G_L$, which is nonlinear processing, and outputs the low-sensitivity image signal $G_L(D_L)$ having undergone gamma conversion to the weight addition circuit 14 on the subsequent stage; a signal processing section 18 for subjecting the composite signal having undergone weighting addition performed by the weight addition circuit 14 to known synchronization processing, to thus output a composite still image signal; and a "k" value determination section 19 which determines a "k" value to be described later (i.e., the value of a composite parameter "k") by means of acquiring values output from the white balance circuits 11, 15 and outputs the "k" value to the weight addition circuit 14. The "k" value assumes $0 \leq k \leq 1$.

The weight addition circuit 14 that compose a high-sensitivity image signal and a low-sensitivity image signal has a multiplication circuit 21 for outputting a signal $[k \cdot G_H(D_H)]$ determined by multiplying the high-sensitivity image signal $G_H(D_H)$ captured from the gamma conversion circuit 13 by the value of the composite parameter "k"; a multiplication circuit 22 for outputting a signal $[(1-k) \cdot G_L(D_L)]$ determined by multiplying the low-sensitivity image signal $G_L(D_L)$ captured from the gamma conversion circuit 17 by a value $(1-k)$ obtained as a result of subtraction of the parameter "k" from 1; and an addition circuit 23 which adds together the signals output from the multiplication circuits 21, 22 and outputs an addition signal $Gc[=k \cdot G_H(D_H)+(1-k) \cdot G_L(D_L)]$ as a composite signal to the signal processing section 18.

Operation of the digital camera having the foregoing configuration will now be described.

During a period in which an unillustrated power source of the digital camera remains activated and the digital camera remains in a photographing mode, an image signal is always read from the solid-state imaging element 3 at a predetermined cycle. The exposure condition determination section 7 captures an image signal output from the ADC 4 at all times, computes optimum exposure conditions at different times, and outputs the exposure conditions to the system control section 5. Specifically, the exposure condition determination section 7 captures the high-sensitivity image signal and the low-sensitivity image signal, thereby determining an exposure time optimum for the photographing scene.

An optimum exposure time is determined in, e.g., the following manner. When a histogram of the high-sensitivity image signal obtained for the case of an optimum exposure time is plotted, two peaks appear. One peak appears in the vicinity of the center of the histogram, and the other peak appears at a position in excess of saturation power. Similarly, when a histogram of the low-sensitivity image signal obtained for the optimum exposure time is plotted, two peaks also appear. One peak appears in the vicinity of the center of the histogram, and the other peak appears in the vicinity of zero; that is, the region of the high-sensitivity image signal. An exposure time during which such peaks appear in the histogram is determined as an optimum exposure time.

The system control section 5 outputs a control command to the drive section 6 such that the above-described optimum exposure time is attained, thereby controlling operation pulses to the optical system 1, the mechanical shutter 2, and the solid-state imaging element 3.

Here, when the user has pressed an unillustrated shutter button of the digital camera, the electronic shutter is opened, and the mechanical shutter 2 is closed after lapse of a predetermined exposure time. A high-sensitivity image signal is first read from the high-sensitivity pixels of the solid-state imaging element 3, and the high-sensitivity image signal output from the ADC 4 is stored in the memory 12 after having undergone white balance correction performed by the white balance circuit 11, by way of the switch 10 shown in FIG. 2.

The low-sensitivity image signal is read from the low-sensitivity pixels of the solid-state imaging element 3. The low-sensitivity image signal output from the ADC 4 is subjected to white balance correction in the white balance circuit 15 by way of the switch 10 shown in FIG. 2. Subsequently, the low-sensitivity image signal is stored in the memory 16.

The high-sensitivity image signal output from the high-sensitivity pixel and the low-sensitivity image signal output from the low-sensitivity pixel, both pixels being located at the same position, are read on a per-pixel basis from the memory devices 12, 16. The pixels are subjected to gamma conversion in the gamma conversion circuits 13, 17. Next, the signals are merged together by the image weight addition circuit 14 through use of the value of the composite parameter "k."

Figure 3:
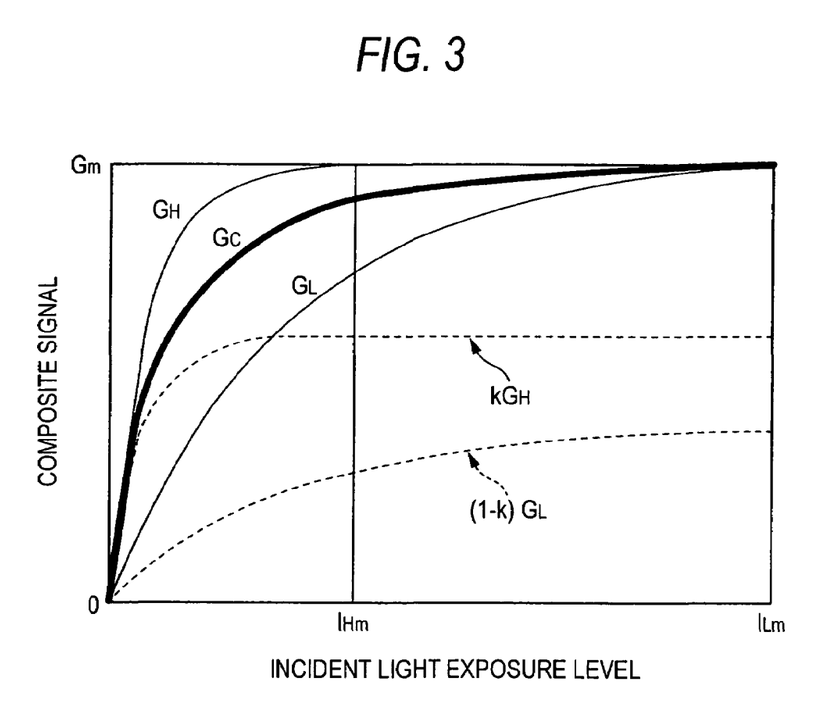
FIG. 3 is a descriptive view of the image composition of the first embodiment of the present invention.

FIG. 3 is a descriptive view of composing of signals according to the embodiment. A curve $G_H$ shown in FIG. 3 represents a gamma characteristic (a conversion characteristic of the gamma conversion circuit 13) of the high-sensitivity image signal and has the following characteristics. The incident light exposure level (on the horizontal axis) becomes constant at a level higher than a saturation level $I_{Hm}$ or more, and the high-sensitivity image signal (a gamma characteristic $G_H$) becomes constant at a saturation value Gm (usually a value of 255, with an accuracy of 8 bits). The slope of the gamma characteristic $G_H$ is always 0 or positive, and the gamma characteristic $G_H$ increases monotonously. The slope becomes smaller with an increase in the incident light exposure level, and the slope assumes a value of 0 in the vicinity of the saturation level $I_{Hm}$.

A change in slope is not great, and settings are made such that the slope changes smoothly (continuously). However, there may be a case where an S-shaped characteristic is imparted to the slope in order to prevent noise from becoming noticeable in the vicinity of 0. In such a case, the slope temporarily increases in the vicinity of 0.

A curve $G_L$ shown in FIG. 3 shows a gamma characteristic (a conversion characteristic of the gamma conversion circuit 17) of the low-sensitivity image signal and has the following characteristics. When the incident light exposure level reaches the saturation level $I_{Lm}$, the low-sensitivity image signal (a gamma characteristic $G_L$) assumes the saturation value $G_m$. The slope of the gamma characteristic $G_L$ assumes a value of "0" or is positive at all times and the gamma characteristic $G_H$ increases monotonously. The slope becomes smaller with an increase in the incident light exposure level.

In relation to the gamma characteristic $G_L$, the slope does not need to be set to "0" in the vicinity of the saturation level $I_{Lm}$, as in the case of the gamma characteristic $G_H$, but a value of 0 may be selected for the slope. A change in slope is not great, and settings are made such that the slope changes smoothly (continuously). The low-sensitivity image signal becomes constant at the saturation value $G_m$ in excess of the saturation level $I_{Lm}$.

In the embodiment, the high-sensitivity image signal $G_H(D_H)$ and the low-sensitivity image signal $G_L(D_L)$ are merged together according to the value of "k" by means of a composing expression $Gc=k \cdot G_H(D_H)+(1-k) \cdot G_L(D_L)$.

FIG. 3 shows the high-sensitivity image signal $G_H(D_H)$ (illustrated only as "$G_H$") multiplied by a factor of "k"; the low-sensitivity image signal $G_L$ (illustrated only as "$G_L$") multiplied by a factor of "1−k"; and the composite signal Gc.

Weighting addition of the high-sensitivity image signal and the low-sensitivity image signal is equivalent to weighting addition of the gamma characteristic $G_H$ assigned to the high-sensitivity image signal and the gamma characteristic $G_L$ assigned to the low-sensitivity image signal. The value of the composite parameter "k" corresponds to assignment of a gradation (bit) to the high-sensitivity image signal in the composite signal.

As the value of the composite parameter approaches "1", the high-sensitivity image signal becomes dominant over the entire image. In contrast, when the value of the composite parameter "k" approaches "0," the low-sensitivity image signal becomes dominant over the entire image. An intermediate between these cases is attained in the case of k=½, wherein a balance is achieved between the high-sensitivity image signal and the low-sensitivity image signal over the entire image.

The "k" value determination section 19 shown in FIG. 2 determines the "k" value used in image composition for each pixel position from the high-sensitivity image signal and the low-sensitivity image signal, both having undergone white balance correction. Specifically, the "k" value determination section 19 of the present embodiment is characterized by determining the "k" value such that a contribution of the low-sensitivity image signal becomes greater in a bright portion of the screen and such that a contribution of the high-sensitivity image signal becomes greater in a dark portion of the screen; and by determining the "k" value so as to become optimum for respective regions within one screen.

The "k" value determination section 19 determines the optimum value "k" at a certain pixel position of interest (x, y) in the following manner. In the case of 8-bit 256 gradations, a value of 205, which is about 80% of the 256 gradations, is taken as a threshold value, and a determination value obtained when the signal level of the high-sensitivity image signal achieved at each pixel position is 205 or more is taken as 0. When the signal level is less than 205, the determination value is taken as 1.

There are determined determination values ("1", "0") at respective pixel positions within a square area of $(2N+1)^2$ pixels centered on the position of a pixel of interest (where N is a positive integer, and N should preferably assume a fraction, some tenths, or thereabouts, of the number of pixels of the solid-state imaging element 3 in the direction "x" or the number of pixels of the solid-state imaging element 3 in the direction "y"). An $A_{av}$ value is obtained by subjecting a determination value of 1 or 0 to weighting average of $(2N+1)^2$ and, hence, assumes a value of $0 \leq A_{av} \leq 1$.

Figure 4:
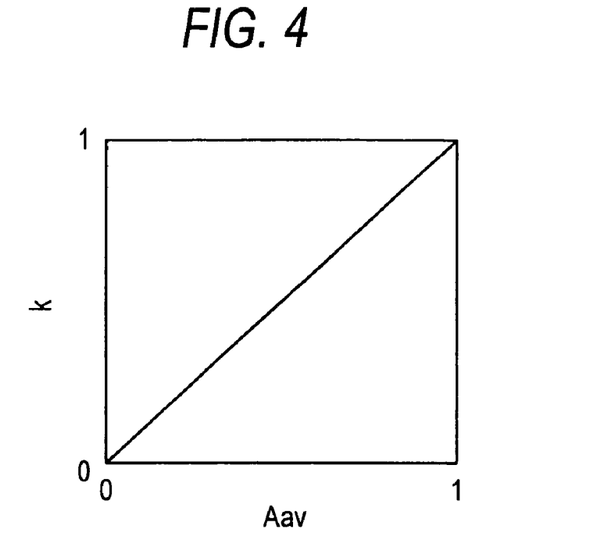
FIG. 4 is a view showing a function to be used for describing a method for determining a "k" value, which is to be performed by the image processing section of the first embodiment of the present invention.
Figure 5:
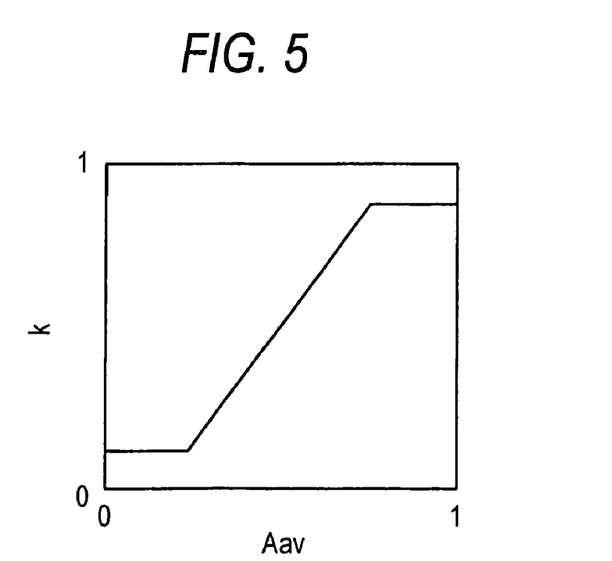
FIG. 5 is a view showing another function to be used for describing a method for determining a "k" value, which is to be performed by the image processing section of the first embodiment of the present invention.

A function to be used for determining the "k" value from the $A_{av}$ value is arbitrary. For instance, the function ($k=A_{av}$) shown in FIG. 4 or the function shown in FIG. 5 is used. The threshold value to be used for determining the determination value 1 or 0 is described, in the above embodiment, as being a value which is 80% of a saturation value of the high-sensitivity image signal. The saturation value can be set arbitrarily. The 1 or 0 value at each pixel position may be determined by the low-sensitivity image signal rather than by the high-sensitivity image signal. Moreover, a determination may be made through use of both the high-sensitivity image signal and the low-sensitivity image signal.

As can be seen from FIG. 3, the composite gamma characteristic Gc produced by composing through use of the thus-determined "k" value becomes a monotonously-increasing function regardless of magnitude of the "k" value if the value "k" is constant or undergoes few variations, and hence the brightness inversion phenomenon does not arise.

In the dark area in the room, the "k" value is close to "1." Hence, the high-sensitivity image signal $G_H(D_H)$ in the composing expression Gc becomes dominant. Hence, a clear image without solid black is obtained. Moreover, in the case of a scene of window panes, which is a bright area, the "k" value is close to 0. Hence, the low-sensitivity image signal $G_L(D_L)$ becomes dominant, and hence a superior image that does not lose color is obtained. The "k" value gradually changes from a large value close to 1 to a small value close to 0 in the vicinity of a boundary between the window panes and the indoors. Therefore, even when brightness inversion has arisen, the brightness inversion does not become noticeable.

In the image composition using the "k" value of the embodiment, the "k" value is subjected to small changes in the case of a local pale black line or a local pale white line, and hence brightness inversion does not arise. Thus, a natural image is obtained, and no color offset phenomenon arises in the case of a color image.

In the above-described embodiment, there can be produced a well-defined composite image which has a superior signal-to-noise ratio, involves little brightness inversion or color offset, and has a wide dynamic range.

The method for determining an N value or a "k" value employed for determining a range in which the determination value is subjected to averaging may be changed in accordance with a photographing scene. In the embodiment shown in FIG. 2, the "k" value is determined through use of the linear high-sensitivity image signal and the linear low-sensitivity image signal, being output from the white balance circuits 11, 15, respectively. However, the "k" value may be determined through use of the high-sensitivity image signal and the low-sensitivity image signal, both having undergone gamma conversion.

The "k" value determination section is for determining a "k" value of a pixel of interest in accordance with brightness or darkness of an optical image within a predetermined range centered on the pixel position of interest. The only requirement of the "k" value determination section is to fulfill the following conditions: when the optical image is relatively dark, the "k" value is determined as a relatively large value (close to 1); and when the optical image is relatively bright, the "k" value is determined as a relatively small value (close to 0).

The embodiment has described an example in which the image processing section 9 of the digital camera merges the high-sensitivity image signal and the low-sensitivity image signal and outputs resultant still image data. However, the present invention can also be applied to a case where the high-sensitivity image signal and the low-sensitivity image signal are stored in a recording medium as RAW data and where a composite image is produced by means of reading the RAW data through use of, e.g., a personal computer.

Second Embodiment

Figure 6:
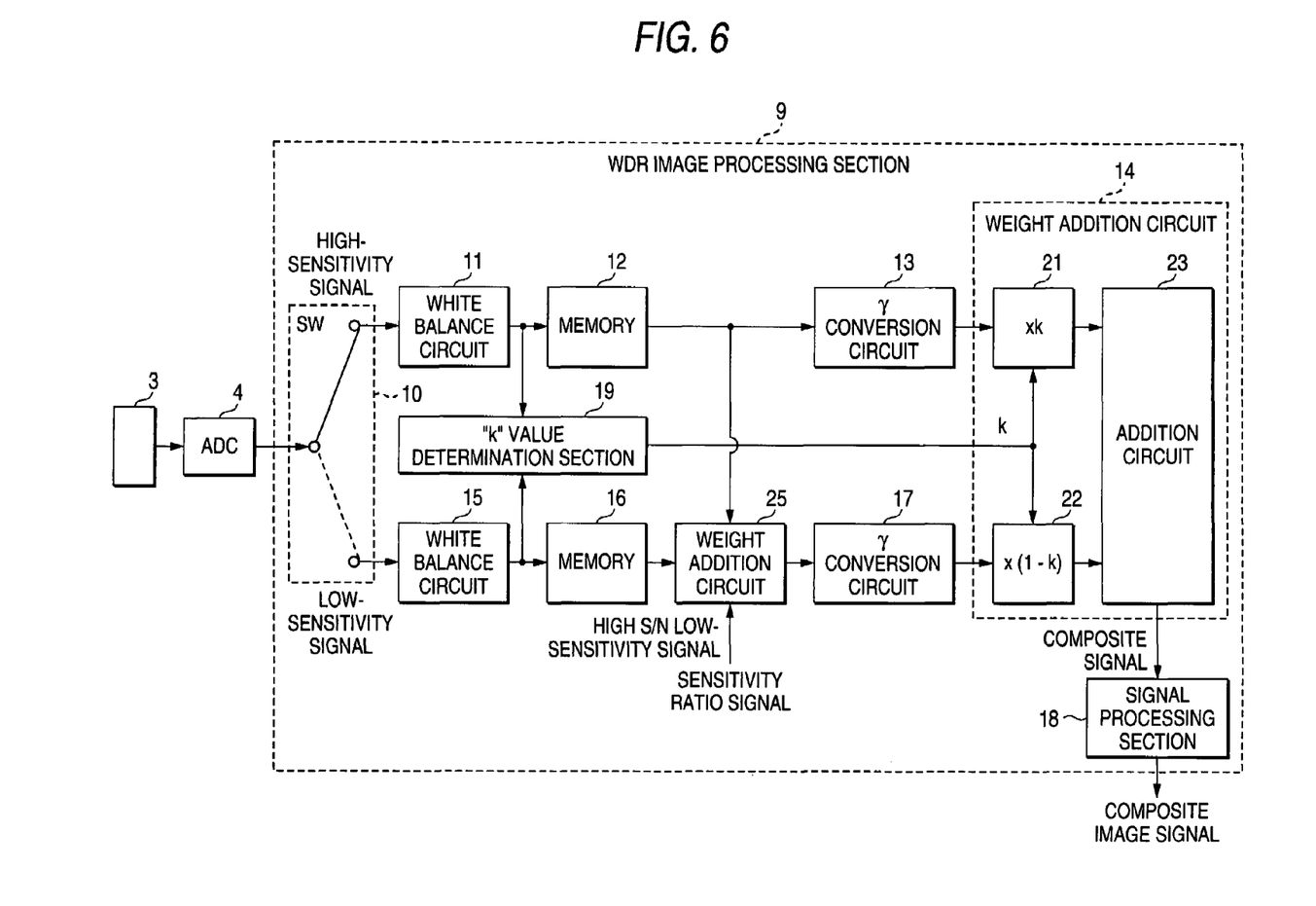
FIG. 6 is a detailed block diagram of an image processing section of a digital camera according to a second embodiment of the present invention.

FIG. 6 is a detailed block diagram of the image processing section 9 of the digital camera according to a second embodiment of the present invention. The entire digital camera is identical in configuration with the digital camera of the first embodiment shown in FIG. 1.

The present embodiment differs from the first embodiment in that a weight addition circuit 25 for enhancing a signal-to-noise ratio of the low-sensitivity image signal is inserted into a stage subsequent to the memory 16 for temporarily storing the low-sensitivity image signal which has been subjected to white balance correction by the white balance circuit 15, and in that an output from the weight addition circuit 25 is input to the gamma conversion circuit 17. In other respects, the present embodiment is identical with the first embodiment.

The weight addition circuit 25 receives inputs; that is, a high-sensitivity image signal output from the white balance circuit 11 by way of the memory 12; a low-sensitivity image signal output from the white balance circuit 15 by way of the memory 16; and the sensitivity ratio R. When the exposure condition determination section 7 shown in FIG. 1 has determined an optimum exposure time, the sensitivity ratio R is determined as a high-sensitivity signal/a low-sensitivity signal=sensitivity ratio R for a single optical input. The sensitivity ratio R is output from the system control section 5 to the weight addition circuit 25.

In the first embodiment, a portion of the low-sensitivity image signal, the signal level of the portion being low, is used in its present form as a composite signal for composing images. However, the low-level low-sensitivity image signal is inferior in terms of a signal-to-noise ratio and deteriorates the picture quality of a composite image. For this reason, in the present embodiment, the weight addition circuit 25 is added to the image processing section 9. Of the image signal of low intensity $D_L$ output from the white balance circuit 15, the low-sensitivity image signal $D_L$ having a low signal level is replaced with another signal $D'_L$ having a high signal-to-noise ratio. The signal $D'_L$ used for replacement is generated through use of the high-sensitivity image signal $D_H$ having a high signal-to-noise ratio output from the white balance circuit 11, as indicated by the following expression.

$$D'_L = D_L (D_H > D_{H2})$$

$$D'_L = D_H/R (D_H < D_{H1})$$

$$D'_L = \alpha \cdot D_L + (1-\alpha) \cdot D_H/R \text{ (in another case)}$$

where $D_L$ denotes a linear value of the low-sensitivity image signal; $D_H$ is a linear value of the high-sensitivity image signal; and $D_{H1}$, $D_{H2}$ denote predetermined linear values of the high-sensitivity image signal satisfying [$D_{H1} < D_{H2} <$ linear saturation value of the high-sensitivity image signal], where $$\alpha = (D_H - D_{H1})/(D_{H2} - D_{H1}).$$

As mentioned above, in the area of the signal level where the value of the high-sensitivity image signal $D_H$ is lower than the predetermined value $D_{H1}$, the low-sensitivity image signal $D_L$—which is used for the composing expression and has not yet undergone gamma conversion—is replaced with a signal obtained by subjecting to weighting addition the low-sensitivity image signal $G_L$ and the signal which is determined by means of dividing the high-sensitivity image signal $D_H$ by the sensitivity ratio R, thereby enhancing the signal-to-noise ratio of the low-level portion of the composite image signal.

Third Embodiment

Figure 7:
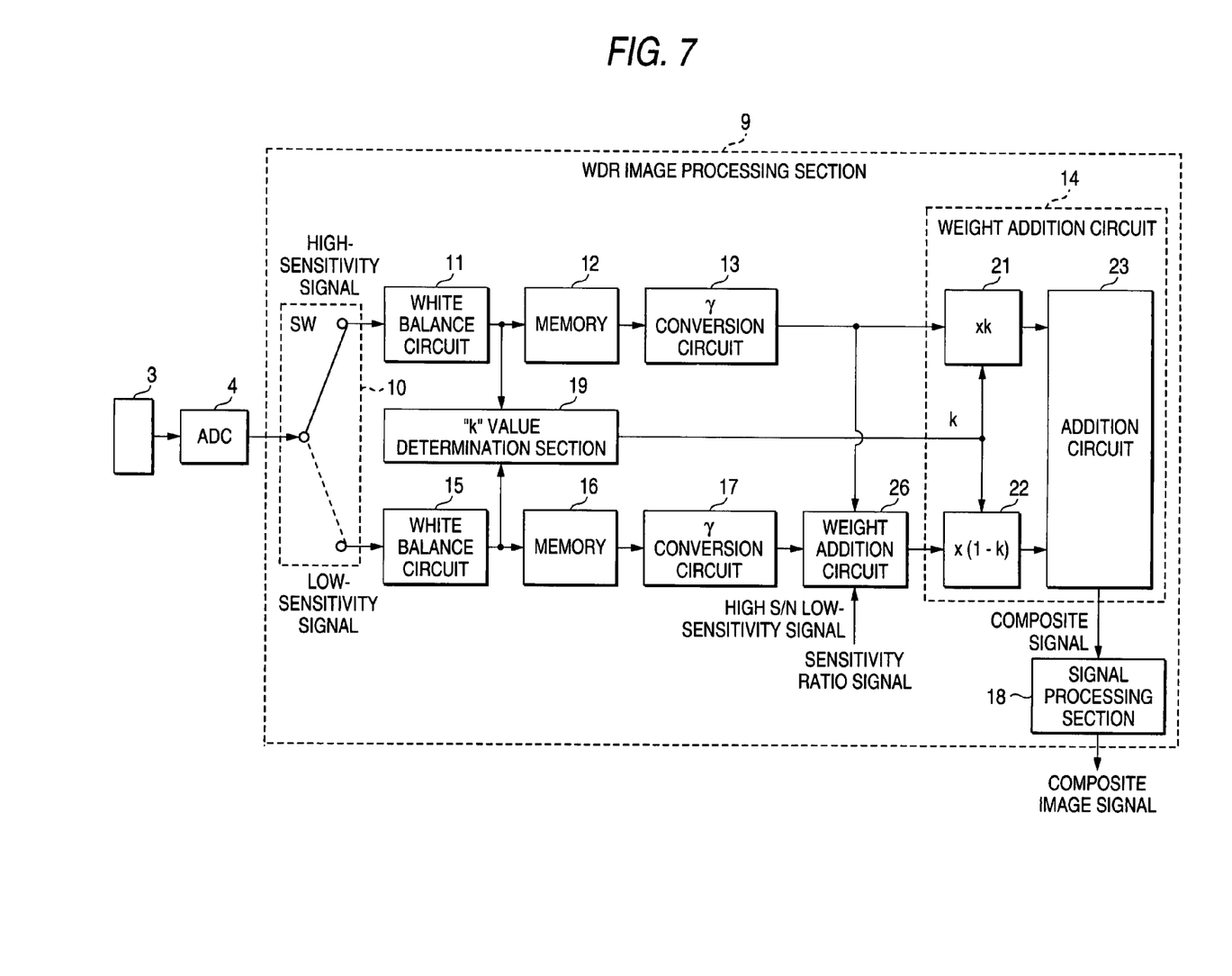
FIG. 7 is a detailed block diagram of an image processing section of a digital camera according to a third embodiment of the present invention.

FIG. 7 is a detailed block diagram of the image processing section 9 of the digital camera according to a third embodiment of the present invention. The entire digital camera of the third embodiment is identical in configuration with the digital camera of the first embodiment shown in FIG. 1 and that of the second embodiment.

The present embodiment differs from the second embodiment in that a weight addition circuit 26 is provided in a stage subsequent to the gamma conversion circuit 17, in contrast with the case of second embodiment in which the weight addition circuit 25 is disposed at the stage prior to the gamma conversion circuit 17. In other respects, the present embodiment is identical with the second embodiment.

In the second embodiment, the linear value of the low-sensitivity image signal is subjected to enhancement of the signal-to-noise ratio of the low-sensitivity image signal. In contrast, in the present embodiment the low-sensitivity image signal having undergone gamma conversion is subjected to enhancement of the signal-to-noise ratio of the low-sensitivity image signal. The weight addition circuit 26 receives inputs; that is, the high-sensitivity image signal $G_H(D_H)$ output from the gamma conversion circuit 13; the low-sensitivity image signal $G_L(D_L)$ output from the gamma conversion circuit 17; and the sensitivity ratio R. Subscripts ($D_H$), ($D_L$) of $G_H(D_H)$, $G_L(D_L)$ or the like are omitted, and only $G_H$, $G_L$ are used.

Specifically, in the present embodiment, the low-sensitivity image signal $G_L$ having a low signal level among the low-sensitivity image signal $G_L$ output from the gamma conversion circuit 17 is replaced with the low-sensitivity image signal $G'_L$ produced from the high-sensitivity image signal $G_H$ having a high signal-to-noise ratio. The signal $G'_L$ used for replacement is replaced by the following expression.

$$G'_L = G_L (G_H > G_{H2})$$

$$G'_L = G_H/R' (G_H < G_{H1})$$

$$G'_L = \beta \cdot G_L + (1-\beta) \cdot G_H/R' \text{ (in another case)}$$

where $G_{H1}$, $G_{H2}$ denote predetermined linear values of the high-sensitivity image signal satisfying [$G_{H1} < G_{H2} <$ saturation value of high-sensitivity image signal obtained after gamma conversion], where $\beta = (G_H - G_{H1})/(G_{H2} - G_{H1})$. Further, R' is a sensitivity ratio to be used for converting the high-sensitivity image signal into the low-sensitivity image signal and is obtained after the sensitivity ratio R has been subjected to gamma conversion. The sensitivity ratio R' is a constant value falling within the range of $1 \leq R' \leq R$.

As mentioned above, in the area of the signal level where the value of the high-sensitivity image signal $G_H$ is lower than the predetermined value $G_{H1}$, the low-sensitivity image signal $G_L$—which is used for the composing expression and before undergoing gamma conversion—is replaced with a signal obtained by weighting average of the low-sensitivity image signal $G_L$ and the signal derived by division of the high-sensitivity image signal $G_H$ by the sensitivity ratio R', thereby enhancing the signal-to-noise ratio of the low-level portion of the composite image signal to a much greater extent.

Fourth Embodiment

Figure 8:
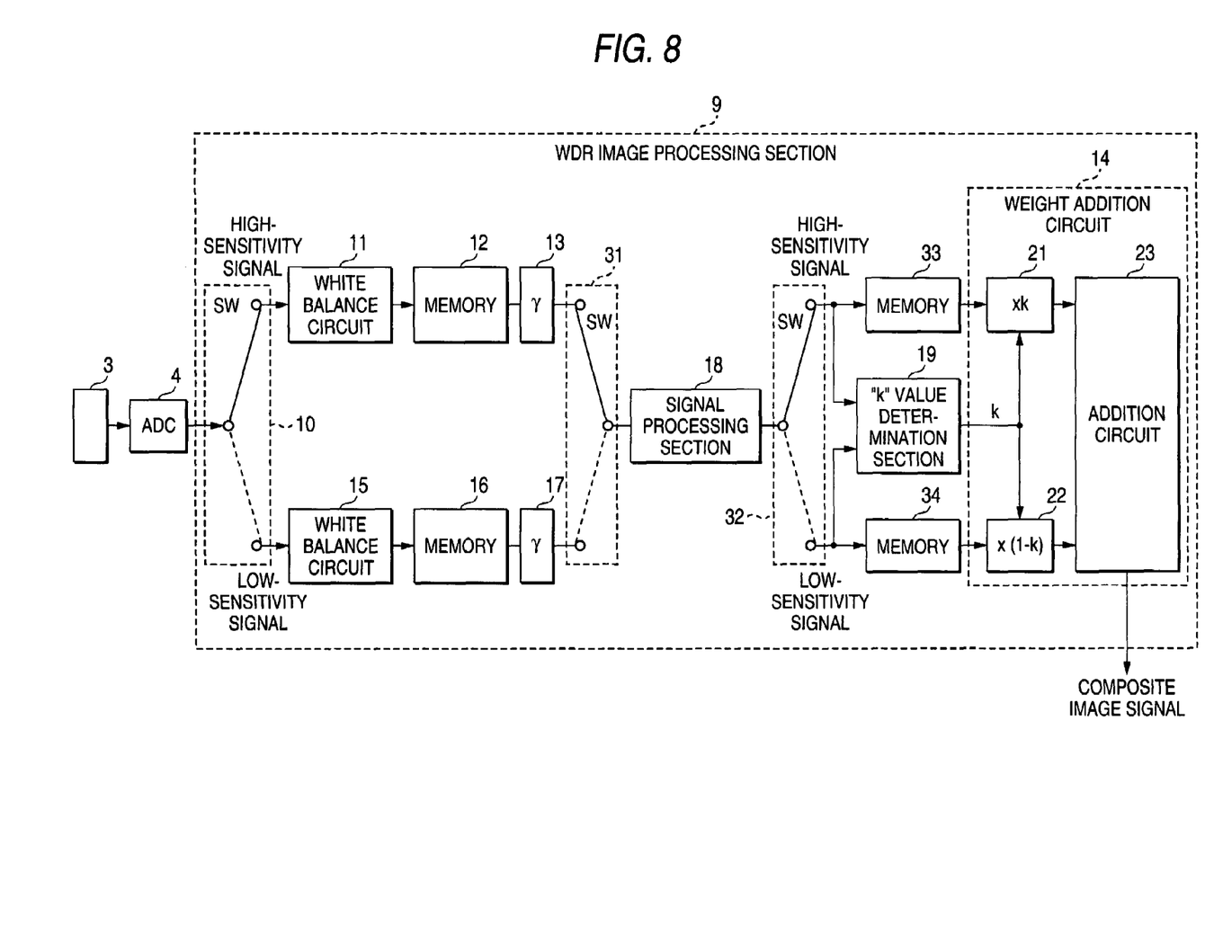
FIG. 8 is a detailed block diagram of an image processing section of a digital camera according to a fourth embodiment of the present invention.

FIG. 8 is a detailed block diagram of the image processing section 9 of the digital camera according to a fourth embodiment of the present invention. The entire digital camera is identical in configuration with the digital camera of the first embodiment shown in FIG. 1.

The image processing section 9 of the first embodiment merges the high-sensitivity image signal and the low-sensitivity image signal, and the resultant composite image signal is subjected to synchronization processing in the signal processing section 18. The image processing section 9 of the present embodiment differs from the image processing section 9 of the first embodiment in that the signals are subjected to white balance correction processing in the white balance circuits 11, 15; in that the high-sensitivity image signal and the low-sensitivity image signal, both being temporarily stored in the memory devices 12, 16, are subjected to gamma conversion by means of the gamma correction circuits 13, 17; in that the resultant signals are input to the signal processing section 18 by way of a switch 31; and in that synchronization processing is first performed, and a composite signal is subsequently produced through use of the "k" value.

Specifically, in the image processing section of the present embodiment, synchronization processing is performed through use of the signal processing section 18, and the high-sensitivity image signal is delivered to memory 33 by means of a switch 32. Further, the low-sensitivity image signal is delivered to memory 34 by means of the switch 32. The "k" value is determined from the high-sensitivity image signal and the low-sensitivity image signal, both having undergone synchronization processing. The high-sensitivity image signal stored in the memory 33 and the low-sensitivity image signal stored in the memory 34 are merged by the weight addition circuit 14 through use of the "k" value. In the present embodiment, such operations also yield the same advantage as that of the first embodiment.

The weight addition circuit 25 of the second embodiment or the weight addition circuit 26 of the third embodiment is added to the configuration of the present embodiment, thereby enabling enhancement of the signal-to-noise ratio in the same manner as in the second and third embodiments.

In the present embodiment, the "k" value is determined from the high-sensitivity image signal and the low-sensitivity image signal, both having undergone synchronization processing. The "k" value may be determined from the high-sensitivity image signal and the low-sensitivity image signal, both having not yet undergone synchronization processing.

Further, the respective embodiments have been described while a digital camera photographing color images is taken as an example. As a matter of course, the present invention can also be applied to a digital camera photographing black-and-white images. Further, the embodiments have described that the gamma characteristic to be used for subjecting the high-sensitivity image signal to gamma conversion differs from a gamma characteristic to be used for subjecting the low-sensitivity image signal to gamma conversion. However, the present invention can also be put into practice by rendering these gamma characteristics identical with each other. In such a case, the capacity of the memory required to store the table of gamma characteristics is curtailed.

In the second and third embodiments, the weight addition circuits 25, 26 are incorporated in the digital camera. However, needless to say, a personal computer can subject RAW data pertaining to the high-sensitivity image signal and the low-sensitivity image signal to the signal processing to be performed by these weight addition circuits.

According to the present invention, there can be obtained a well-defined image having a superior signal-to-noise ratio, little brightness inversion, little color offset, and a wide dynamic range.

According to the present invention, there can be generated a composite image suitable for adjusting a gradation of a high-sensitivity image signal (or a low-sensitivity image signal) in accordance with bright/dark areas in a screen when an image of a subject having a wide dynamic range is generated by means of composing the high-sensitivity image signal and the low-sensitivity image signal. Hence, the present invention can be utilized as a digital camera, an image composition method, and a solid-state imaging device.

The entire disclosure of each and every foreign patent application from which the benefit of foreign priority has been claimed in the present application is incorporated herein by reference, as if fully set forth.

What is claimed is:

1. An image composition method comprising:
composing a high-sensitivity image signal H and a low-sensitivity image signal L, so as to generate a composite image signal Gc according to a composing expression:

$$Gc = k \cdot H + (1-k) \cdot L$$

where k is a composite parameter satisfying $0 \leq k \leq 1$,
wherein the high-sensitivity image signal H is generated based on high-sensitivity image outputs from corresponding ones of a plurality of pixel positions in a solid-state imaging element that has imaged a subject;

the low-sensitivity image signal L is generated based on low-sensitivity image outputs from corresponding ones of the plurality of pixel positions in the solid-state imaging element;

the composing is performed at every common pixel position by determining k at every common pixel position;

wherein the high-sensitivity image signal H is a signal $G_H(D_H)$ obtained by converting a high-sensitivity image signal $D_H$ with a nonlinear characteristic $G_H$ for a high-sensitivity image signal, the high-sensitivity image signal $D_H$ being generated based on the high-sensitivity image outputs; and the low-sensitivity image signal L is a signal $G_L(D_L)$ obtained by converting a low-sensitivity image signal $D_L$ with a nonlinear characteristic $G_L$ for a low-sensitivity image signal, the low-sensitivity image signal $D_L$ being generated based on the low-sensitivity image outputs; and wherein the nonlinear characteristic $G_H$ for the high-sensitivity signal and the nonlinear characteristic $G_L$ for the low-sensitivity signal have a characteristic of realizing a monotonously-increasing function, whose change in a secondary differential value is positive or zero at all times.

2. The image composition method according to claim 1, wherein the high-sensitivity image output and the low-sensitivity image output are image outputs from a high-sensitivity pixel and a low-sensitivity pixel in a common pixel position, respectively.

3. The image composition method according to claim 1, wherein the high-sensitivity image output is an image output by a longer period of exposure, and the low-sensitivity image output is an image output by a shorter period of exposure, by using a common pixel.

4. The image composition method according to claim 1, further comprising:

replacing the low-sensitivity image signal $D_L$ before undergoing nonlinear conversion with a low-sensitivity image signal $D'_L$ formed from the high-sensitivity image signal $D_H$ before undergoing nonlinear conversion, in a signal level range in which a liner value of the high-sensitivity image signal $D_H$ is lower than a predetermined level.

5. The image composition method according to claim 1, wherein, when a high-sensitivity image signal/a low-sensitivity image signal at a predetermined exposure time is assumed to be equal to a sensitivity ratio, the low-sensitivity image signal $D'_L$ is obtained as a result of subjecting to weighting average the low-sensitivity image $D_L$ and a signal provided as [the high-sensitivity image signal $D_H$/the sensitivity ratio]; and the low-sensitivity image signal $D_L$, which is subjected to the weighting average in accordance with a change in the high-sensitivity signal $D_H$ from the predetermined level to a zero level, is changed from 100% to 0%.

6. The image composition method according to claim 1, further comprising:

replacing the nonlinearly-converted low-sensitivity image signal $G_L(D_L)$ with a low-sensitivity image signal $G'_L$ formed from the nonlinearly-converted high-sensitivity image signal $G_H(D_H)$, in a signal level range in which a linear value of the high-sensitivity image signal $D_H$ is lower than a predetermined level.

7. The image composition method according to claim 1, wherein, when a high-sensitivity image signal/a low-sensitivity image signal at a predetermined exposure time is assumed to be equal to a sensitivity ratio and a nonlinearly-converted sensitivity ratio is obtained by nonlinearly-converting the sensitivity ratio, the low-sensitivity image signal $G'_L$ is obtained as a result of subjecting to weighting average the low-sensitivity image $G_L(D_L)$ and a signal obtained by dividing [the high-sensitivity image signal $G_H(D_H)$/the nonlinearly-converted sensitivity ratio]; and the low-sensitivity image signal $G_L(D_L)$, which is subjected to the weighting average in accordance with a change in the high-sensitivity signal $G_H(D_H)$ from the predetermined level to a zero level, is changed from 100% to 0%.

8. The image composition method according to claim 1, wherein, in a case where the k for the pixel position of interest is determined, the k is determined as a value closer to 1 when an optical image is relatively dark and the k is determined as a value closer to 0 when the optical image is relatively bright, in accordance with a mean contrast of the optical image within a predetermined range centered on the pixel position of interest.

9. The image composition method according to claim 8, further wherein, the k value used in image composition for each pixel position from the high-sensitivity image signal and the low-sensitivity image signal, wherein both said high-sensitivity and said low-sensitivity image signals having undergone white balance correction, is characterized by determining the k value such that a contribution of the low-sensitivity image signal becomes greater in a bright portion of the screen and such that a contribution of the high-sensitivity image signal becomes greater in a dark portion of the screen; and by determining the k value so as to become optimum for respective regions within one screen, whereby the k value gradually changes from a large value to a small value in the vicinity of a boundary between a bright area and a dark area.

10. A solid-state imaging device comprising:

a solid-state imaging element comprising a plurality of pixel positions, the solid-state imaging element imaging a subject; and an image processing portion that composes a high-sensitivity image signal H and a low-sensitivity image signal L, so as to generate a composite image signal Gc according to a composing expression:

$Gc = k \cdot H + (1-k) \cdot L$ where k is a composite parameter satisfying $0 \leq k \leq 1$, wherein the high-sensitivity image signal H is generated based on high-sensitivity image outputs from corresponding ones of the plurality of pixel positions;

the low-sensitivity image signal L is generated based on high-sensitivity image outputs from corresponding ones of the plurality of pixel positions;

the composing is performed at every common pixel position by determining k at every common pixel position;

wherein the high-sensitivity image signal H is a signal $G_H(D_H)$ obtained by converting a high-sensitivity image signal $D_H$ with a nonlinear characteristic $G_H$ for a high-sensitivity image signal, the high-sensitivity image signal $D_H$ being generated based on the high-sensitivity image outputs; and the low-sensitivity image signal L is a signal $G_L(D_L)$ obtained by converting a low-sensitivity image signal $D_L$ with a nonlinear characteristic $G_L$ for a low-sensitivity image signal, the low-sensitivity image signal $D_L$ being generated based on the low-sensitivity image outputs; and wherein the nonlinear characteristic $G_H$ for the high-sensitivity signal and the nonlinear characteristic $G_L$ for the low-sensitivity signal have a characteristic of realizing a monotonously-increasing function, whose change in a secondary differential value is positive or zero at all times.

11. The solid-state imaging device according to claim 10, wherein the high-sensitivity image output and the low-sensitivity image output are image outputs from a high-sensitivity pixel and a low-sensitivity pixel in a common pixel position, respectively.

12. The solid-state imaging device according to claim 10, wherein the high-sensitivity image output is an image output by a longer period of exposure, and the low-sensitivity image output is an image output by a shorter period of exposure, by using a common pixel.

13. The solid-state imaging device according to claim 10, further comprising:
   replacing the low-sensitivity image signal $D_L$ before undergoing nonlinear conversion with a low-sensitivity image signal $D'_L$ formed from the high-sensitivity image signal $D_H$ before undergoing nonlinear conversion, in a signal level range in which a linear value of the high-sensitivity image signal $D_H$ is lower than a predetermined level.

14. The solid-state imaging device according to claim 10, wherein, when a high-sensitivity image signal/a low-sensitivity image signal at a predetermined exposure time is assumed to be equal to a sensitivity ratio, the low-sensitivity image signal $D'_L$ is obtained as a result of subjecting to weighting average the low-sensitivity image $D_L$ and a signal provided as [the high-sensitivity image signal $D_H$/the sensitivity ratio]; and the low-sensitivity image signal $D_L$, which is subjected to the weighting average in accordance with a change in the high-sensitivity signal $D_H$ from the predetermined level to a zero level, is changed from 100% to 0%.

15. The solid-state imaging device according to claim 10, further comprising:
   replacing the nonlinearly-converted low-sensitivity image signal $G_L(D_L)$ with a low-sensitivity image signal $G'_L$ formed from the nonlinearly-converted high-sensitivity image signal $G_H(D_H)$, in a signal level range in which a linear value of the high-sensitivity image signal $D_H$ is lower than a predetermined level.

16. The solid-state imaging device according to claim 10, wherein, when a high-sensitivity image signal/a low-sensitivity image signal at a predetermined exposure time is assumed to be equal to a sensitivity ratio and a nonlinearly-converted sensitivity ratio is obtained by nonlinearly-converting the sensitivity ratio, the low-sensitivity image signal $G'_L$ is obtained as a result of subjecting to weighting average the low-sensitivity image $G_L(D_L)$ and a signal obtained by dividing [the high-sensitivity image signal $G_H(D_H)$/the nonlinearly-converted sensitivity ratio]; and the low-sensitivity image signal $G_L(D_L)$, which is subjected to the weighting average in accordance with a change in the high-sensitivity signal $G_H(D_H)$ from the predetermined level to a zero level, is changed from 100% to 0%.

17. The solid-state imaging device according to claim 10, wherein, in a case where the k for the pixel position of interest is determined, the k is determined as a value closer to 1 when an optical image is relatively dark and the k is determined as a value closer to 0 when the optical image is relatively bright, in accordance with a mean contrast of the optical image within a predetermined range centered on the pixel position of interest.

* * * * *